United States Patent [19]

Magill et al.

[11] Patent Number: 5,827,350

[45] Date of Patent: Oct. 27, 1998

[54] MACHINE AND METHOD FOR SEPARATING AEROSOL PARTICLES

[75] Inventors: Joseph Magill, Karlsruhe; Paul Werner, Dettenheim, both of Germany

[73] Assignee: European Atomic Energy Community (EURATOM), Plateau du Kirchberg, Luxembourg

[21] Appl. No.: 601,018

[22] PCT Filed: Jul. 27, 1994

[86] PCT No.: PCT/EP94/02472

§ 371 Date: Jul. 1, 1996

§ 102(e) Date: Jul. 1, 1996

[87] PCT Pub. No.: WO95/03872

PCT Pub. Date: Feb. 9, 1995

[30] Foreign Application Priority Data

Jul. 27, 1993 [LU] Luxembourg ................ 88387

[51] Int. Cl.$^6$ ................................ B01D 51/08
[52] U.S. Cl. ................ 95/29; 55/277; 55/337; 55/DIG. 25; 95/268; 95/271; 261/DIG. 48
[58] Field of Search ................ 55/277, 320, 337, 55/DIG. 25; 95/29, 30, 267, 268, 269, 271; 96/175; 261/81, DIG. 48

[56] References Cited

U.S. PATENT DOCUMENTS

| | | | |
|---|---|---|---|
| 2,935,375 | 5/1960 | Boucher | 95/29 X |
| 3,026,966 | 3/1962 | Asklof | 55/277 X |
| 3,387,607 | 6/1968 | Gauthier et al. | 261/DIG. 48 |
| 3,681,009 | 8/1972 | Horsley | 55/277 X |
| 4,226,179 | 10/1980 | Sheldon, III et al. | 55/277 X |
| 4,307,964 | 12/1981 | Dudgeon et al. | 55/277 X |
| 4,319,891 | 3/1982 | Anderson et al. | 95/29 |
| 4,378,976 | 4/1983 | Rush | 55/277 X |
| 5,085,673 | 2/1992 | Bentley et al. | 95/29 |

FOREIGN PATENT DOCUMENTS

| | | |
|---|---|---|
| 0 117 586 | 9/1984 | European Pat. Off. |
| 20 60 617 | 6/1971 | Germany |
| 42 30 482 | 3/1993 | Germany |

*Primary Examiner*—Richard L. Chiesa
*Attorney, Agent, or Firm*—Darby & Darby

[57] ABSTRACT

A machine and method for separating aerosol particles in a cylindrical ultrasonic member in which the particles are agglomerated in the presence of an injected allgomeration initiator, and retaining the agglomerated particles in a filter.

4 Claims, 1 Drawing Sheet

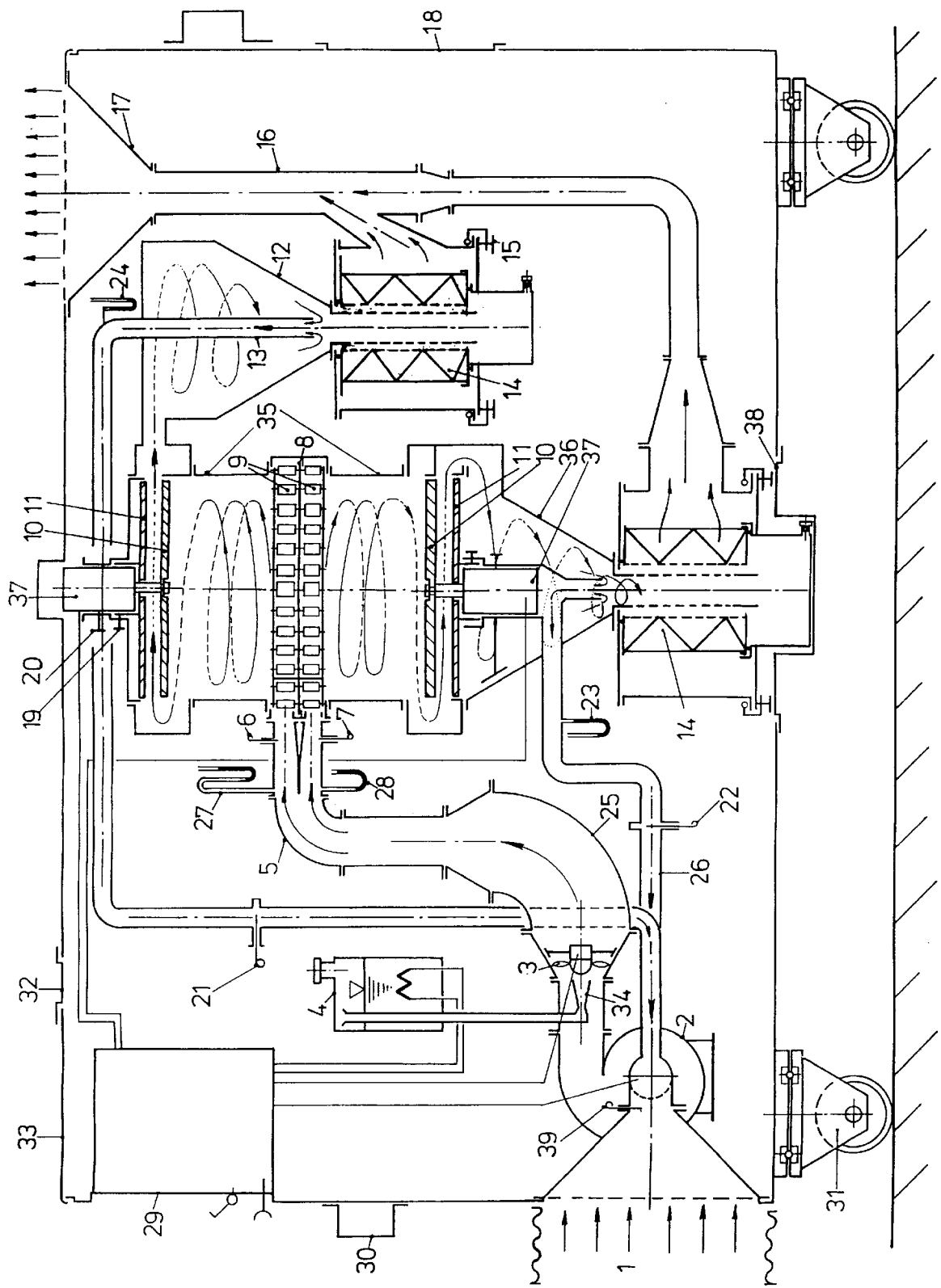

MACHINE AND METHOD FOR SEPARATING AEROSOL PARTICLES

The invention refers to a machine for separating aerosol particles, the machine comprising a cylindrical ultrasonic member in which the particles are agglomerated in the presence of an injected agglomeration initiator, and a filter for retaining the agglomerated particles.

This machine can be used for extracting toxic aerosols from gaseous atmospheres which can for example result from a radioactive fire accident, conventional fire accidents, a chemical fire accident or from uncontrolled chemical reactions, especially in closed rooms. Conventional high efficiency particulate air filter systems can in fact only be of limited use for separating large quantities of toxic aerosols in combination with soot or water vapour. A further field of application concerns the recovery of industrially valuable particles from gas flows.

Subsequent to an electric current breakdown, to the formation of soot and fire exhaust gases, extremely complicated conditions can exist after an accident in closed rooms for the fire brigade which require full safe overalls with integrated air condition, emergency illumination means etc. or which render the penetration of those rooms by the fire brigade completely impossible due to the noxious gases, the exhaust gases and the absolute darkness.

In closed rooms, fire goes out due to lack of oxygen. For this reason it is not possible to extract incineration particles and fire gases by providing openings for the extraction of these gases as this entails the admission of oxygen and the creation of new flames.

Thus, in such or similar cases, first of all the exhaust gases, which possibly contain toxic aerosols, must be eliminated from the affected room without allowing new oxygen to penetrate into said room.

From the patent ES-459 523 A1 a method and a device are known for purifying exhaust gases by ultrasonic means. According to this device, a stationary acoustic field is created in a cylindrical ultrasonic chamber into which exhaust gases are injected in a tangential direction. The exhaust gases move along a spiral path from one front side of the chamber to the other and are mixed with an agglomeration initiator for improving the agglomeration, this initiator being injected into the chamber at several points.

The operation of such a device is unsatisfactory primarily if the aerosol particles to be separated are very small (smaller than 0,1 $\mu$m). In fact, in this case, the mass inertia of the particles is so low that they are not vibrated by the ultrasonic field to such an extent that they collide with adjacent particles. In this case, the helical path of the aerosol particles through the ultrasonic chamber is too short as to provide with high probability the collision with other particles. The agglomeration effect cannot be substantially increased by injecting water droplets and by spraying liquids into the gas charged with the aerosol to be separated. Therefore, the requirements of environment protection impose an improved cleaning process such that for example highly toxic materials such as plutonium particles or dusts from toxic industrial processes are extracted as completely as possible from the concerned gas.

The object of the invention is therefore to propose a machine allowing to securely separate toxic aerosols in order to allow rapidly an access to the polluted room for repair purposes.

This object is achieved according to the invention by the machine and method for operating the machine as defined in the appended claims.

BRIEF DESCRIPTION OF THE DRAWING

The invention will now be described in more detail by means of a preferred embodiment and the unique drawing which shows schematically the machine according to the invention.

DESCRIPTION OF THE PREFERRED EMBODIMENT

The machine for extracting toxic aerosols from gaseous environments comprises a radial fan 2 which aspires through an inlet grid 1 the gaseous atmosphere charged with toxic aerosols. From the outlet side of this fan 2, the gas is blown under increased pressure and at high speed into a mixer chamber 25 provided at the inlet with a distributor 34. From a pressure container 4 which can be heated and filled, the distributor 34 is supplied with vapour saturated with glycol at for example 300° C., this vapour being introduced into the gaseous atmosphere charged with the toxic aerosols. The cold toxic gaseous atmosphere is intensely mixed by a rotational mixer 3 with the hot saturated glycol vapour and is then driven towards the mixing chamber 25 in which the mixture produces a slowly flowing mist due to the higher channel volume and the reduced flow speed. The mist mixture of toxic aerosols and gases passes through an entry 5 and is then divided into two currents of approximately equal quantity which are separated one from the other by a plate 8 and which are then fed via two cylindrical stationary deflection grids 9 along a tangentially rotating movement into a cylindrical process recipient 35. The position of the stationary blades of the grid 9 is selected such that due to the substantially increased flow cross-section in the recipient 35, the charged gas flows slowly upwards along a spiral path as indicated in the drawing.

The toxic gas-mist mixture is then submitted by circular vibrator plates 10 to an ultrasonic field of about 20 kHz and at a power level of for example 155 dB. The mixture of gas and aerosol agglomerates the toxic aerosol particles in spite of their small size (<1 $\mu$m) and become larger particles of between about 5 $\mu$m and 20 $\mu$m, due to the particular physical agglomeration properties of the glycol mist which condensates in the cold medium and due to the simultaneous effect of the ultrasonic particles vibration.

Thereafter, while still slowly rotating, the aerosol-gas mixture passes at the end of spiral-shaped enlargements of the process recipient 35 between the circular vibrator plates 10 and the circular resonance plates 11 and is thereby submitted to a very intense agglomeration between the circular plate 10 which vibrates at ultrasonic frequency, and the circular plate 11 which can be positioned by adjustment screws 19.

The process recipient 35 including the stationary blade grid 9 and the plate 8 is constructed in such a way that the gas is driven into a largely uniform rotation flow due to the tangential spiral shaped guidance through the adjustable stationary grid blades. The number of turns can be adjusted by the fan (volume, pressure) and by the adjustment of the stationary blades allowing to modify the direction of flow. The gas flow rate is adjusted by valves 6 and 7 and is measured by gauges 27 and 28.

The multiple slow rotation of the gas flow between an ultrasonic vibrator plate 10 and the plate 8 acting as reflector and the effect of the irradiated ultrasonic energy between the backside of the ultrasonic vibrator plates 10 and further reflector plates 11 there-behind result in a considerable increase of the time during which the aerosol particles are treated by the ultrasonic field. Thereafter, the gas flow and the agglomerated particles are treated in a cyclone separator 12, 36 from which the larger agglomerated particles are withheld by a filter 14, whereas the smaller particles are fed back to the fan 2 via suction channels 13, 26. Due to this feedback via the channels 13 and 26 and valves 21, 22 and 39, the particles which have not yet agglomerated to become larger particles can be recycled as often as necessary. The purified gas leaves the filter and the machine by an outlet channel 16 and a diffusor 17.

In this way, it is possible to clean after a relatively short time the toxic atmosphere in a room which has been contaminated by toxic aerosol gases.

The value of the required suction pressure and the desired volume rate for recycling the smaller particles which leave the separator is adjusted via measuring gauges 23 and 24 and valves 21, 22 and 39.

The electric supply and high voltage energy for the fan 2, the evaporation heating in the container 4 and the ultrasonic generators 37 is furnished by a distinct electric unit 29.

The supply and disposal of new and used materials and the inspection are ensured via flaps 15, 18, 32, 33 and 38.

The machine presents a compact structure and is moved by means of handles 30 and rotatable wheels towards or into the polluted room.

We claim:

1. A machine for separating aerosol particles, comprising a cylindrical ultrasonic chamber in which the particles agglomerate in the presence of an injected agglomeration initiator, and a filter for withholding the agglomerated particles, wherein upstream of the ultrasonic chamber, a mixing zone is provided into which a vapour acting as agglomeration initiator is injected into the flow of aerosol particles, thereby producing a mist, and wherein a cyclone separator receives the flow from the ultrasonic chamber and separates the agglomerated heavier particles, releasing a part of the aerosol in the filter and recycling the remaining aerosol towards the mixing zone.

2. A machine according to claim 1, wherein the ultrasonic chamber consists of two partial chambers of identical function, which chambers are juxtaposed via a common ultrasonic reflector plate, and a vibrator plate is provided at each frontal face of the ultrasonic chamber remote from the ultrasonic reflector plate, the gas injection into the chamber on either side of the reflector plate being performed tangentially and the outlet from the chamber being situated at the peripheral border of the respective vibrator plate ().

3. A machine according to claim 1, wherein valves are provided in the aerosol path, said valves being controlled by pressure gauges in such a way that the recycling of the remaining aerosols towards the mixing zone as well as the residence time of the aerosol in the ultrasonic field can be optimized.

4. A method for operating a machine for separating aerosol particles, said machine comprising a cylindrical ultrasonic chamber in which the particles agglomerate in the presence of an injected agglomeration initiator, and a filter for withholding the agglomerated particles, wherein upstream of the ultrasonic chamber, a mixing zone is provided into which a vapour acting as agglomeration initiator is injected into the flow of aerosol particles, thereby producing a mist, and wherein a cyclone separator receives the flow from the ultrasonic chamber and separates the agglomerated heavier particles, releasing a part of the aerosol in the filter and recycling the remaining aerosol towards the mixing zone, wherein the material of the agglomeration initiator is glycol, which is injected into the mixing zone as a saturated vapour.

* * * * *